(12) United States Patent
Xiang

(10) Patent No.: US 9,502,917 B2
(45) Date of Patent: Nov. 22, 2016

(54) CHARGING METHOD OF ELECTRONIC CIGARETTES AND ELECTRONIC CIGARETTE BOX

(71) Applicant: Zhiyong Xiang, Dongguan (CN)

(72) Inventor: Zhiyong Xiang, Dongguan (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 574 days.

(21) Appl. No.: 13/968,066

(22) Filed: Aug. 15, 2013

(65) Prior Publication Data
US 2014/0360512 A1    Dec. 11, 2014

(30) Foreign Application Priority Data

Jun. 5, 2013 (CN) .......................... 2013 1 0222343

(51) Int. Cl.
*H02J 7/00* (2006.01)
*A24F 47/00* (2006.01)
*H02J 7/04* (2006.01)

(52) U.S. Cl.
CPC ............ *H02J 7/0077* (2013.01); *A24F 47/008* (2013.01); *H02J 7/045* (2013.01)

(58) Field of Classification Search
CPC ........ H02J 7/0045; H02J 7/007; A24F 15/18

USPC .......................... 320/107, 114–115, 137, 151
See application file for complete search history.

(56) References Cited

U.S. PATENT DOCUMENTS

| | | | |
|---|---|---|---|
| 2013/0342157 A1* | 12/2013 | Liu | A24F 15/18 320/107 |
| 2014/0285937 A1* | 9/2014 | Xiang | H02H 3/202 361/91.2 |
| 2014/0305820 A1* | 10/2014 | Xiang | A24F 15/18 206/236 |
| 2015/0054465 A1* | 2/2015 | Liu | H02J 7/0045 320/114 |

* cited by examiner

*Primary Examiner* — Paul Dinh
(74) *Attorney, Agent, or Firm* — Tim Tingkang Xia, Esq.; Locke Lord LLP

(57) ABSTRACT

The present invention relates to a charging method of an electronic cigarette and an electronic cigarette box. The charging method of the electronic cigarette comprising: presetting first voltage and current, and second voltage and current, charging the electronic cigarette with the first voltage and current for a preset length of time, detecting actual charging current or charging voltage to the electronic cigarette, comparing the actual charging current or charging voltage with the second current or voltage separately, selecting different charging modes to the electronic cigarette according to a comparing result. The electronic cigarette box is enabled to be compatible with different charging management modes for charging the electronic cigarettes, and the charging modes can be automatically selected according to the different charging management modes of the electronic cigarette.

18 Claims, 6 Drawing Sheets

CHARGING METHOD OF ELECTRONIC CIGARETTES AND ELECTRONIC CIGARETTE BOX

CROSS-REFERENCE TO RELATED APPLICATIONS

This non-provisional application claims priority under 35 U.S.C. §119(a) on Patent Application No. 201310222343.8 filed in P.R. China on Jun. 5, 2013, the entire contents of which are hereby incorporated by reference.

FIELD OF THE INVENTION

The present invention relates to the field of electrical cigarettes, and more particularly, relates to a charging method of electronic cigarettes and an electronic cigarette box.

BACKGROUND OF THE INVENTION

An electronic cigarette box is a device configured for storing electronic cigarettes. In addition, the electronic cigarette box can further use a rechargeable battery to store energy and charge a battery inside an electronic cigarette.

At present, there are generally two kinds of charge management methods for batteries inside electronic cigarettes. In one of the two methods, there is a charging management circuit in a charging circuit of an electronic cigarette, and an electronic cigarette box can adopt a 5V direct current (DC) voltage to charge a battery inside the electronic cigarette. In the other of the two methods, there is no charging management circuit in a charging circuit of an electronic cigarette, and an electronic cigarette box needs to charge a battery inside the electronic cigarette by means of using constant charging current and limiting a charging voltage to be not more than 4.2V charge.

From the above, if there is no charging management circuit in an electronic cigarette, but an electronic cigarette box directly uses the 5V DC voltage to charge a battery of the electronic cigarette, there is a risk of overcharging, and the battery of the electronic cigarette may be even caused to explode. If there is a charging management circuit in an electronic cigarette, but an electronic cigarette box charges a battery inside the electronic cigarette by means of using constant charging current and limiting a charging voltage to be not more than 4.2V, charging under charging may be caused, long charging time may be spent, and the needs of users are unable to be met well. In order to solve above problems, if an electronic cigarette box is provided with two different charging modules to charge the electronic cigarette with the charging management circuit and the electronic cigarette without the charging management circuit respectively, the cost is high, and user' needs are unable to be met well yet.

SUMMARY OF THE INVENTION

The present invention is configured to solve the problem of prior art that an electronic cigarette box can only charge either an electronic cigarette with a charging management circuit or an electronic cigarette without a charging management circuit, and to solve the defect that it cannot be compatible with both the two kinds of electronic cigarettes. Thus, a charging method for electronic cigarettes and an electronic cigarette box are provided.

The technical solutions of the present invention for solving the technical problems are as follows: a charging method of electronic cigarettes, comprising:

S1、 presetting a first voltage, a first current, a length of time, a second current and a second voltage;

S2、 charging an electronic cigarette with the first voltage as charging voltage and the first current as a maximum value of charging current for the length of time;

S3、 detecting actual charging current or actual charging voltage to the electronic cigarette;

S4、 comparing the actual charging current or the actual charging voltage with the second current or the second voltage separately;

S5、 selecting one of charging modes to charge the electronic cigarette according to a comparing result.

Advantageously, the charging modes include a first charging mode and a second charging mode; when the actual charging current is more than or equal to the second current, or the actual charging voltage is less than or equal to the second voltage, the first charging mode is selected to charge the electronic cigarette; and when the actual charging current is less than the second current or the actual charging voltage is more than the second voltage, the second charging mode is selected to charge the electronic cigarette.

Advantageously, the first charging mode is a charging mode of charging the electronic cigarette with a constant charging current and a charging voltage to be not more than 4.2V.

Advantageously, the second charging mode is a charging mode of charging the electronic cigarette with a 5V charging voltage.

Advantageously, the second current is more than a constant charging current of the electronic cigarette.

Advantageously, the method further includes: detecting the actual charging current in the first charging mode or the second charging mode, and stopping charging the electronic cigarette when the actual charging current is less than a preset third current.

Advantageously, the first voltage is 5V.

Advantageously, the length of time is 1 second.

Advantageously, the first current is more than a constant charging current of the electronic cigarette.

An electronic cigarette box, configured for charging electronic cigarettes, the electronic cigarette box includes:

a microprocessor, a charging detection module respectively connected with the microprocessor and an electronic cigarette, and an electronic cigarette charging module respectively connected with the microprocessor and the electronic cigarette;

wherein the microprocessor is used for presetting with a first voltage, a first current, a length of time, a second current and a second voltage; and the microprocessor is configured to control the electronic cigarette charging module to charge the electronic cigarette with the first voltage and the first current as a maximum value of charging current for the length of time; and the charging detection module is configured to detect actual charging current or actual charging voltage; and the microprocessor is further used for comparing the actual charging current or the actual charging voltage with the second current or the second voltage separately, and controlling the electronic cigarette charging module to select one of charging modes to charge the electronic cigarette according to a comparing result.

Advantageously, the charging modes include a first charging mode and a second charging mode, and when the actual charging current detected by the charging detection module is more than or equal to the second current or the actual charging voltage detected by the charging detection module is less than or equal to the second voltage, the microprocessor is further configured to control the electronic cigarette charging module to select the first charging mode to charge the electronic cigarette; and when the actual charging current detected by the charging detection module is less than the second current or the actual charging voltage detected by the charging detection module is more than the second voltage the microprocessor is further configured to control the electronic cigarette charging module to select the second charging mode to charge the electronic cigarette.

Advantageously, the first charging mode is a charging mode of charging the electronic cigarette with a constant charging current and a charging voltage to be not more than 4.2V.

Advantageously, the second charging mode is a charging mode of charging the electronic cigarette with a 5V charging voltage.

Advantageously, in the first charging mode or the second charging mode, the charging detection module is further configured to detect the actual charging current;

the microprocessor is also used to compare the actual charging current with a preset third current value, and if the actual charging current is less than the preset third current, then the electronic cigarette charging module is controlled to stop charging the electronic cigarette.

Advantageously, the electronic cigarette box also includes a booster module and a rechargeable battery, the booster module is used to boost the voltage of the rechargeable battery to charge the electronic cigarette.

Advantageously, the electronic cigarette box further includes a low voltage detection module, an overcurrent detection module, an overvoltage detection module, a charging module, and a charging management module;

the low voltage detection module is configured to detect the voltage of the rechargeable battery in the electronic cigarette box and a voltage detection results are transmitted to the microprocessor, when the a voltage detection result is less than a preset low voltage, the microprocessor will control the electronic cigarette charging module to stop charging the electronic cigarette; the overcurrent detection module is configured to detect current of charging circuit in the electronic cigarette box and a current detection result is transmitted to the microprocessor, when the current detection result is more than a preset over current, the microprocessor will control the electronic cigarette charging module to stop charging the electronic cigarette;

the overvoltage detection module is configured to detect voltage of the charging circuit in the electronic cigarette box and a voltage detection result is transmitted to the microprocessor, when the voltage detection result is more than a preset high voltage, the microprocessor will control the electronic cigarette charging module to stop charging the electronic cigarette;

the charging module is configured to connect with an external power source, and to charge the rechargeable battery in the electronic cigarette box;

the charging management module is configured to manage the external charging power supply in charging process of the rechargeable battery of the electronic cigarette box, make the charging mode of the rechargeable battery to be constant current or constant voltage mode.

Advantageously, the first current is more than a constant current.

Advantageously, the second current is more than a constant current.

When implementing the charging method of electronic cigarettes and the electronic cigarette box of the present invention, the following advantageous effects can be achieved: the electronic cigarette box is enabled to be compatible with different charging management modes for charging the electronic cigarettes, and the charging modes can be automatically selected according to the different charging management modes of the electronic cigarette. The electronic cigarette box is easy to use, and the cost can be reduced. Users' experiences can be improved, and the users' demands can be met better.

BRIEF DESCRIPTION OF THE DRAWINGS

The present invention will be further described with reference to the accompanying drawings and embodiments in the following, in the accompanying drawings.

DETAILED DESCRIPTION OF THE PREFERRED EMBODIMENT

To make the technical feature, objective and effect of the present invention be understood more clearly, now the specific implementation of the present invention is described in detail with reference to the accompanying drawings and embodiments.

In one embodiment of the present invention, an electronic cigarette is a chargeable electronic cigarette comprising a battery pole. When charging, the battery pole of the electronic cigarette is inserted in a charging socket of an electronic cigarette box. A rechargeable battery in the electronic cigarette box charges the electronic cigarette.

If the electronic cigarette comprises a charging management circuit, a 5V DC voltage can be used to charge a battery of the electronic cigarette. The charging management circuit ensures the electronic cigarette charging process to be constant current charging, constant voltage charging, and trickle current charging in turn. Another case is that, if the electronic cigarette has no charging management circuit, the battery of the electronic cigarette is charged by means of using constant charging current and limiting a charging voltage to be not more than 4.2V.

In the embodiment of the invention, a microprocessor of the electronic cigarette box can detect the charging current in a preset length of time (such as 1 second) to determine whether the electronic cigarette includes a charging management circuit or not, and use a booster module to boost the charging voltage. Thus, the microprocessor can make the electronic cigarette box select different charging modes to charge different electronic cigarettes automatically. The electronic cigarette box is easy to use, and the cost can be reduced. Users' experiences can be improved, and the users' demands can be met better.

Figure 1:
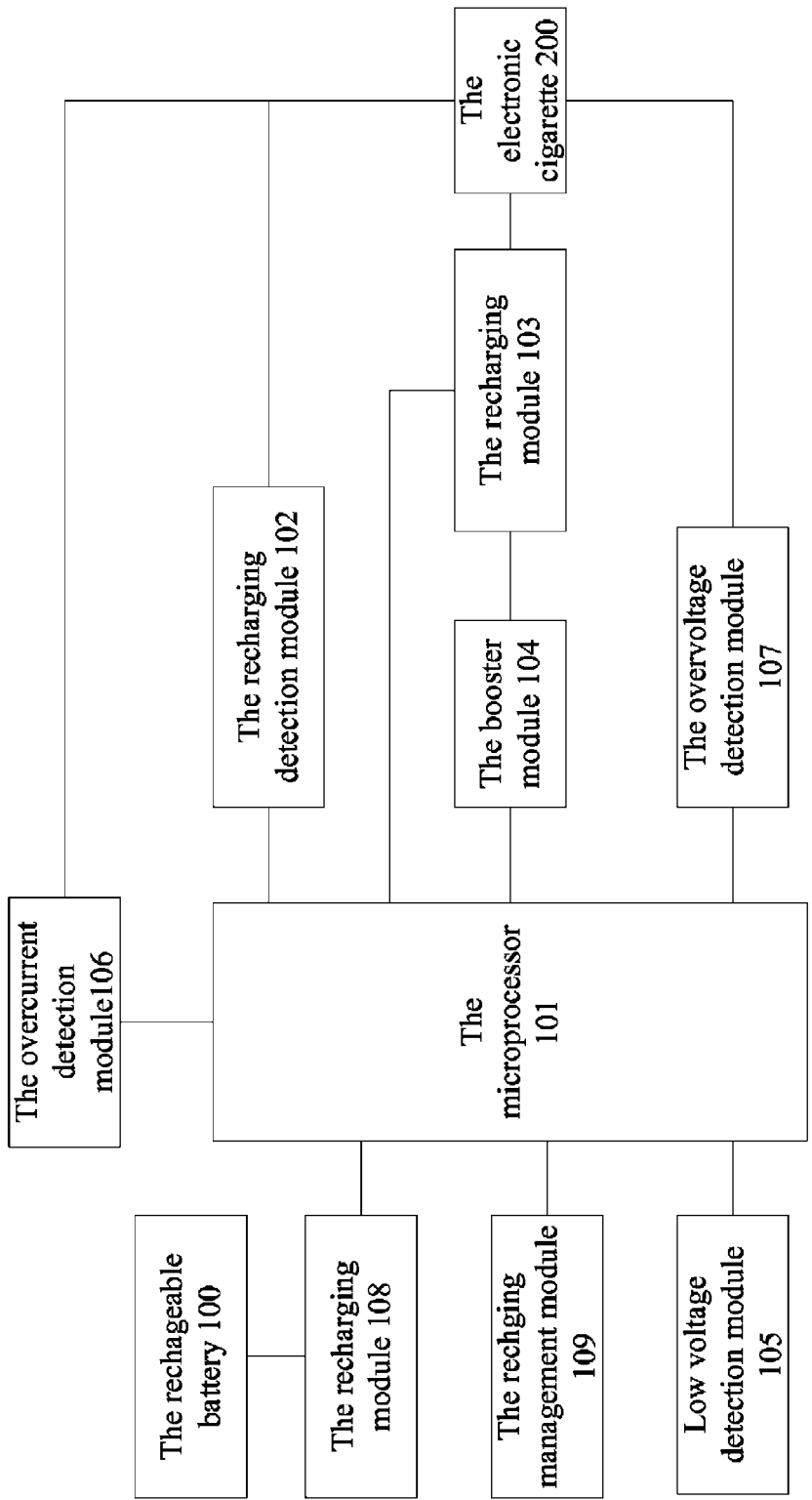
FIG. 1 illustrates a structure of an electronic cigarette box of an embodiment of the present invention.

Referring to FIG. 1, which illustrates a structure of an electronic cigarette box of an embodiment of the present invention.

In this embodiment of the present invention, an electronic cigarette box can be used to charge an electronic cigarette 200. The electronic cigarette box comprises a rechargeable battery 100, a microprocessor 101, a charging detection module 102 connected with the microprocessor 101 and the electronic cigarette 200 respectively, and an electronic cigarette charging module 103 connected with the microprocessor 101, the rechargeable battery 100 and the electronic cigarette 200 respectively.

The microprocessor 101 is configured for controlling the electronic cigarette charging module 103 to charge the electronic cigarette 200 for a preset length of time using a preset first voltage, and limiting a maximum of charging current to be not more than a preset first current value during the charging process.

Figure 2:
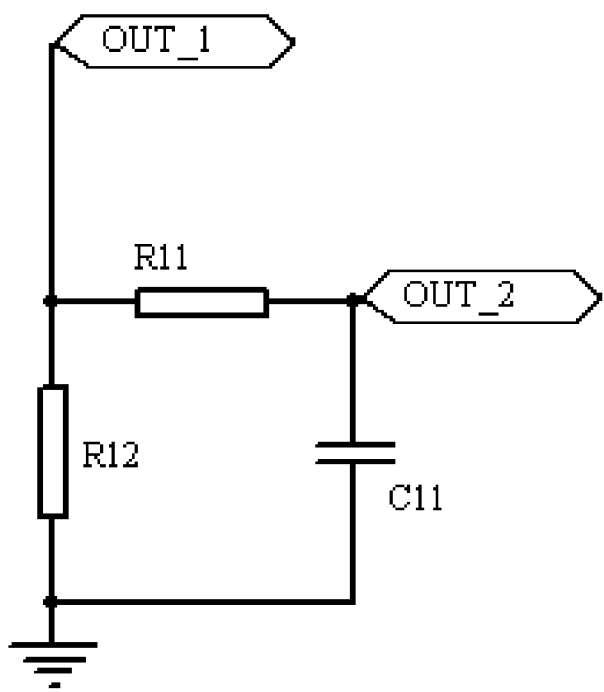
FIG. 2 is a circuit diagram of a charging detection module of an electronic cigarette box of an embodiment of the present invention.

The charging detection module 102 is configured for detecting the charging current or the charging voltage in the charging process with the preset length of the time. Referring to FIG. 2, which is a circuit diagram of the charging detection module 102 of an embodiment of the present invention. The charging detection module 102 comprises two resistors R11, R12, and a capacitor C11. One end of the resistor R11 is connected with the resistor R12 and an OUT_1 end, and the other end of the resistor R11 is connected with an anode of the capacitor C11 and an OUT_2 end; one end of the resistor R12 is connected with the OUT_1 end and one end of the resistor R11, and the other end of the resistor R12 is grounded; the anode of the capacitor C11 is connected with the OUT_2 end, and a cathode of the capacitor C11 is grounded. The OUT_1 end is an anode of an electronic cigarette battery to be charged, and the OUT_2 end is a charging current or voltage detection terminal. A voltage across the resistor R12 detected by the OUT_2 terminal can be regarded as the charging voltage or a voltage across the resistor R11 to calculate the charging current.

The microprocessor 101 is further configured to compare the current value detected by the electronic cigarette charging module 102 with a preset second current value, or compare the voltage value detected by the charging detection module 102 with a preset second voltage value. If the actual charging current value is more than or equal to the preset second current value or the actual charging voltage value is less than or equal to the preset second voltage value, the microprocessor 101 controls the electronic cigarette charging module 103 to charge the electronic cigarette 200 in a first charging mode. If the actual charging current value is less than the preset second current value or the actual charging voltage value is more than the preset second voltage value, the microprocessor 101 controls the electronic cigarette charging module 103 to charging the electronic cigarette 200 in a second charging mode.

In the charging process according to the first charging mode or the second charging mode, the charging detection module 102 is further configured to detect the actual charging current value. The microprocessor 101 is further configured to compare the actual charging current value detected by the charging detection module 102 with a preset third current value. If the actual charging current value is less than the preset third current value, the microprocessor 101 controls the charging module 103 to stop charging the electronic cigarette 200.

Advantageously, in this embodiment of the present invention, the first charging mode is a charging mode that uses constant charging current and limits a charging voltage to be not more than 4.2V.

The second charging mode is a charging mode that uses a 5V charging voltage.

The first current preset value is more than the constant current value of the charging the electronic cigarette.

The preset third current value can be set to be 10 mA.

In the embodiment of the present invention, the preset first current value, the second preset current value, the preset second voltage value, the preset length of time, and the preset first voltage value are all set and stored by the microprocessor 101.

In the embodiment of the present invention, the electronic cigarette box further comprises a booster module 104, a low voltage detection module 105, an overcurrent detection module 106, an overvoltage detection module 107, an electronic cigarette box charging module 108, and a charging management module 109.

The electronic cigarette box charging module 108 is a charging interface, and is configured to connect with an external charging power supply and charge a rechargeable battery of the electronic cigarette box. The charging interface can be an USB charging interface connected with USB devices, and can also be an adapter charging interface connected with adapters.

The charging management module 109 is configured to manage the charging process of the rechargeable battery of the electronic cigarette box using the external charging power supply, and ensure the charging mode of the rechargeable battery to be a constant current or constant voltage mode. When the external charging power supply charges the rechargeable battery 100 of the electronic cigarette box, with use of the charging management module 109, the rechargeable battery 100 is quickly charged by constant current to supply power at first. When the power of the battery is nearly full, the charging mode is switched to a constant voltage mode, the charging current will decrease until the battery is fully charged. The external charging power supply can be a computer charging through a USB charging interface, an adapter charging through an adapter charging interface, etc.

The booster module 104 is configured to boost the voltage of the rechargeable battery 100 of electronic cigarette box and charge the electronic cigarette 200. Because the voltage of the rechargeable battery 100 of the electronic cigarette box, that is fully charged is generally 4.2V, while charging the electronic cigarette 200 comprising a charging management circuit, the voltage to charge the rechargeable battery 100 needs to be slightly more than the voltage of the rechargeable battery 100 of the electronic cigarette box. Therefore, the voltage of the rechargeable battery 100 of the electronic cigarette box needs to be boosted by the booster module 104. In the embodiment of the present invention, the booster module 104 can be a booster chip, or a booster hardware circuit.

Figure 3:
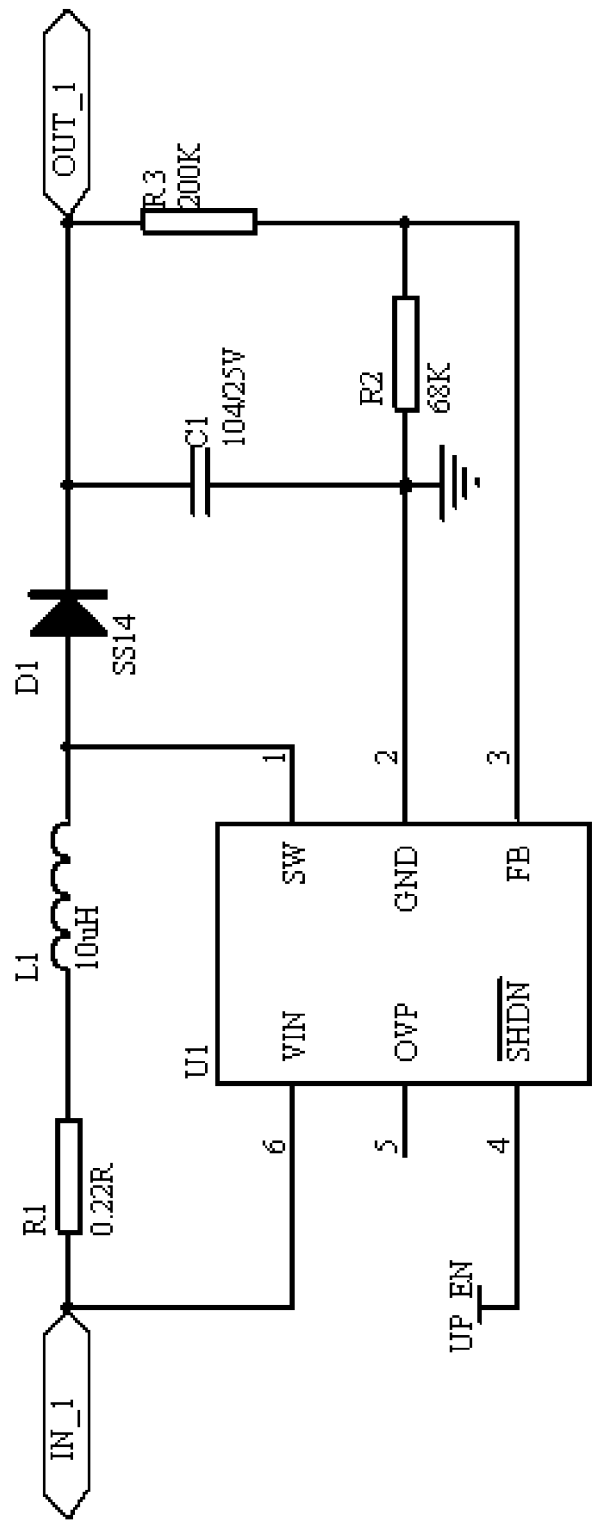
FIG. 3 is a circuit diagram of a booster module of an electronic cigarette battery box of a first embodiment of the present invention.

Referring to FIG. 3, which is a circuit diagram of the booster module of the electronic cigarette battery box of a first embodiment of the present invention. In this embodiment of the present invention, a booster chip U1 is set to be the booster module 104. The type of the boost chip U1 in FIG. 3 is CP2121, and the type of the boost chip U1 can also be MT3608, etc. In FIG. 3, a first pin of the booster chip U1 can be a switch pin; a second pin can be a grounded pin; a third pin can be a feedback voltage pin; and a fourth pin can be an enable pin. When the voltage of the fourth pin is more than 1.4V, the booster chip U1 starts working; and when the voltage of the fourth pin is less than 0.4V, the boost chip U1 will be in the off state. A fifth pin can be an overvoltage protection pin; and a sixth pin can be a chip working voltage pin.

In FIG. 3, the first pin of the booster chip U1 is connected with one end of an inductor L1 and an anode of an diode D1; the other end of the inductor L1 of the booster chip U1 is connected with one end of the resistor R1; and the other end of the resistor R1 is connected with an IN_1 end and the sixth pin. The second pin is grounded, and is connected with a cathode of a capacitor C1; and an anode of the capacitor C1 is connected with the cathode of the diode D1 and the OUT_1 end. One end of the resistor R2 is grounded and is connected with the second pin, and is further connected with the cathode of the capacitor C1. One end of a resistor R3 is connected with the OUT_1 end and the cathode of the diode D1, and the other end of the resistor R3 is connected with one end of the resistor R2 and the third pin. The fourth pin is connected with the enable voltage end UP_EN. Wherein, the IN_1 end can be an anode of the rechargeable battery 100 of the electronic cigarette box, and the OUT_1 end can be an anode of a battery of the electronic cigarette to be charged.

Figure 4:
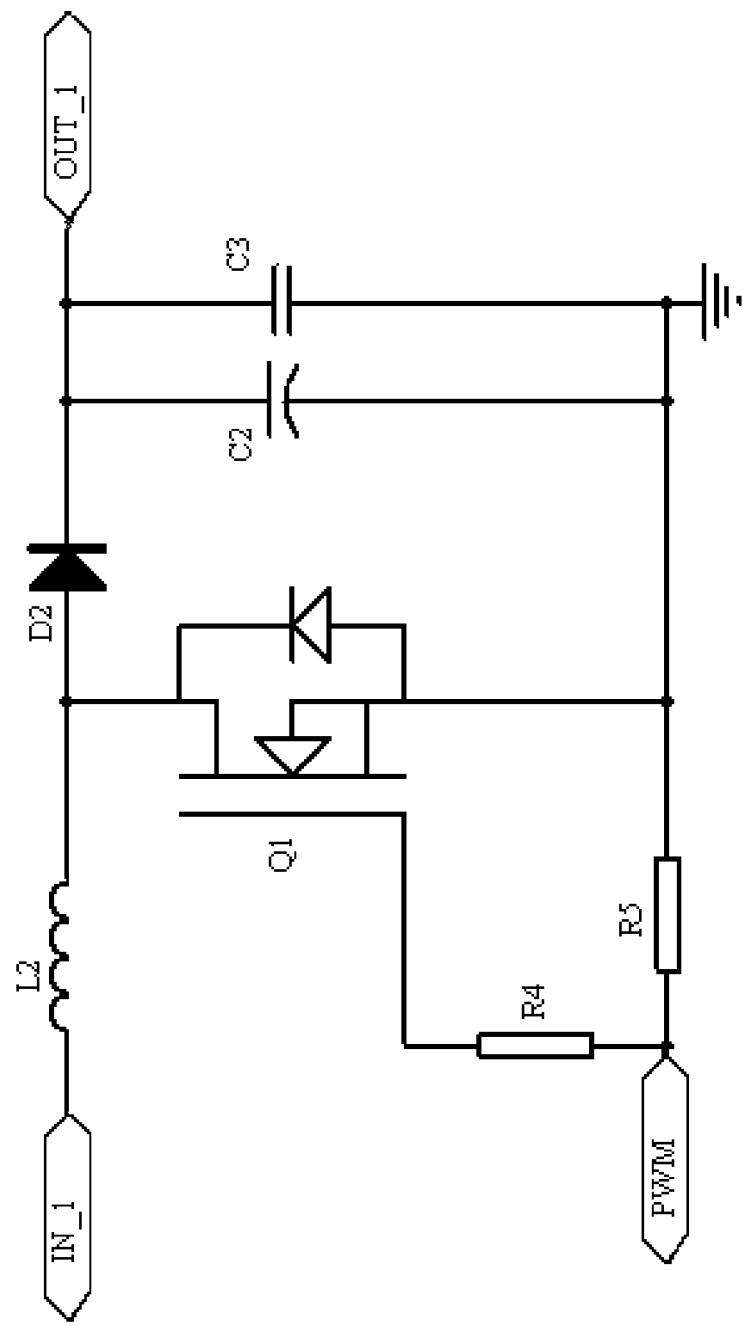
FIG. 4 is a circuit diagram of a booster module of an electronic cigarette battery box of a second embodiment of the present invention.

FIG. 4 is a circuit diagram of a booster module of the electronic cigarette battery box of a second embodiment of the present invention.

In the second embodiment of the present invention, the booster module adopts a booster circuit. The booster circuit includes: a MOS transistor Q1, two resistors R4, R5, two capacitors C2, C3, an inductor L2, and a diode D2. Wherein, a gate of MOS transistor Q1 is connected with a PWM end via the resistor R4, a source of MOS transistor Q1 is grounded and is also connected with the PWM end via the resistor R5, and a drain of MOS transistor Q1 is connected with both one end of the inductor L2 and an anode of the diode D2. The other end of the inductor L2 is connected with the IN_1 end; a cathode of the diode D2 is connected with an anode of the capacitor C2 and an anode of the capacitor C3, and is further connected with the OUT_1 end; a cathode of the capacitor C2 is grounded; and a cathode of the capacitor C3 is grounded. The IN_1 end is the anode of the rechargeable battery 100 of the electronic cigarette box, the OUT_1 end is the anode of the battery of the electronic cigarette box to be charged, and the PWM end is a pulse signal output end of the microprocessor 101. According to actual charging current detected by the overcurrent detection module 106 and actual charging voltage detected by the overvoltage detection module 107, the microprocessor 101 controls the MOS transistor Q1 to be turned on and off by adjusting the duty ratio of the pulse signal output by the pulse signal output end, and realizes adjustment of the charging voltage.

The overvoltage detection module 107 is configured to detect voltage of charging circuit in the electronic cigarette box and transmit the voltage detection results to the microprocessor 101. When the voltage detection result is that the voltage detected is more than a preset voltage value, the microprocessor 101 will control the electronic cigarette charging module to stop charging the electronic cigarette. Advantageously, in the embodiment of the present invention, the overvoltage detection module 107 can detect the voltage of the rechargeable battery 100 of the electronic cigarette box by a method of resistor dividing.

The overcurrent detection module 106 is configured to detect the current of the charging circuit in the electronic cigarette box and transmit the current detection results to the microprocessor 101. When the current detection result is that the current detected is more than a preset current value, the microprocessor 101 will control the electronic cigarette charging module to stop charging the electronic cigarette. Advantageously, the overcurrent detection module 106 of the embodiment of the present invention can adopt circuits that are the same as the charging detection module 102 shown in above FIG. 2. The charging current can be calculated using the voltage of the resistor R11 detected by the OUT_2 end shown in FIG. 2, and when over-current happens, the microprocessor 101 turns off the charging circuit.

The low voltage detection module 105 is configured to detect the voltage of the rechargeable battery 100 in the electronic cigarette box and transmit the voltage detection results to the microprocessor 101. When the voltage detection result is that the voltage of the rechargeable battery 100 is less than a preset voltage value, the microprocessor 101 will control the electronic cigarette charging module to stop charging the electronic cigarette. Advantageously, the low voltage detection module 105 of the embodiment of the present invention can adopt the same principle as the overvoltage detection module 106, that is, the low voltage detection module 105 can detect whether the voltage of the rechargeable battery 100 of the electronic cigarette box is less than a preset threshold value by the method of resistor dividing when charging the electronic cigarette 200. If the voltage of the rechargeable battery 100 of the electronic cigarette box is less than the preset threshold value, the charging process is stopped to protect the rechargeable battery 100 of the electronic cigarette box.

The microprocessor 101 controls the circuit of the electronic cigarette box according to the voltage detection result of the overvoltage detection module 107 and the current detection result of the over-current detection module 106, respectively, thereby provides overvoltage protection and overcurrent protection to the charging circuit of the electronic cigarette box, and further provides low voltage protection to the rechargeable battery 100 according to low voltage detection results of the low voltage detection module 105.

In the embodiment of the present invention, the microprocessor 101 controls the electronic cigarette charging module 103 to charge the electronic cigarette 200 using the preset first voltage value for a preset length of time, and determines whether the electronic cigarette 200 includes a charging management module or not by means of limiting the maximum value of the charging current to be the preset first current value.

Advantageously, the determining method is detailed as follows: the microprocessor 101 controls the electronic cigarette charging module 103 of the electronic cigarette 200 to charge the electronic cigarette 200 for 1 second using a 5V voltage and a limited current A1 at first (advantageously, A1 can be set to be 1A, and A1 should be far more than constant charging current A2 of a conventional electronic cigarette charging management circuit, particularly, $A1 \geq 2A2$). The charging detection module 102 detects actual charging current A3 or actual charging voltage U1 during the charging process. The microprocessor 101 compares A3 with A2 or compares U1 with a preset second voltage value U2. If $A3 \geq (1+50\%)A2$ or $U1 \leq U2$, the microprocessor 101 charges the electronic cigarette 200 using constant current and a limited charging voltage that is not more than 4.2V; if $A3 < (1+50\%)A2$ or $U1 > U2$, the microprocessor 101 charges the electronic cigarette 200 with a 5V voltage. In the charging process, the charging detection module 102 continues to detect the actual charging current. When the actual charging current detected by the charging detection module 102 is less than or equal to 10 mA, the microprocessor 101 controls the electronic cigarette charging module 103 to stop charging the electronic cigarette 200.

In the embodiment of the present invention, the electronic cigarette box can charge the electronic cigarette 200 using different charging management modes. The principle is detailed as follows: when the electronic cigarette charging module 103 charges the electronic cigarette 200 using the preset first voltage value for the preset length of time, and the maximum value of the charging current is limited to be the preset first current value in the charging process, if the actual charging current value detected by the charging detection module 102 is less than the preset second current value or the actual charging voltage detected by the charging detection module 102 is more than the preset second voltage value, the electronic cigarette 200 is regarded as including a charging management circuit.

Particularly, if the electronic cigarette 200 includes a charging management circuit, when the electronic cigarette charging module 103 of the electronic cigarette 200 charges the electronic cigarette 200 with the preset first voltage, such as 5 V, and the charging current is limited to be the preset first current value, the actual charging current value detected by charging detection module 102 will not change significantly (that is, the charging current detected by the charging detection module 102 will be less than the preset second current value), while the actual charging voltage value will change (that is, the charging voltage detected by the charging detection module 102 will be more than the preset second voltage value). Therefore, whether the electronic cigarette 200 includes a charging management circuit or not can be determined according to the actual charging current value or the actual charging voltage value detected by the charging detection module 102. If the electronic cigarette 200 includes a charging management circuit, after being boosted by the voltage booster module 104, the charging voltage of the electronic cigarette 200 is set to be 5V to charge the electronic cigarette 200. If the electronic cigarette 200 does not include a charging management circuit, the electronic cigarette 200 is charged by the charging mode of using constant current and limiting the maximum of voltage to be 4.2 V.

In the embodiment of the present invention, a processor with a type of HT46R065B can be used as the microprocessor 101. According to the processor pins of the HT46R065B, PA4/PWMO/TC1 pins thereof can be selected as the aforementioned pulse signal output end, that is, the PWM end. Furthermore, a number of the input/output pins of the microprocessor are respectively connected with the charging detection module 102, the charging module 103, the voltage booster module 104, the low voltage detection module 105, the overcurrent detection module 106, the overvoltage detection module 107, the charging module 108, and the charging management module 109 to achieve the function of each module.

Understandably, in the embodiment of the invention, the current detected by the overcurrent detection module 106 and the voltage detected by the overvoltage detection module 107 include the current and the voltage provided by the external power supply charging the rechargeable battery 100 of the electronic cigarette box, and further include the current and the voltage provided by the rechargeable battery 100 charging the electronic cigarette 200.

In the embodiment of the present invention, an electronic cigarette box is provided; and the electronic cigarette box can automatically select the charging modes. The electronic cigarette box is provided with a booster module, which can automatically select the charging modes after detecting charging management modes of electronic cigarette. After using the booster module to boost the voltage, an electronic cigarette comprising the charging management circuit is charged with a voltage that is slightly more than a battery voltage (such as 5V), and an electronic cigarette without any charging management circuit is charged by a charging mode using constant current and limiting the maximum of voltage to be 4.2 V.

Figure 5:
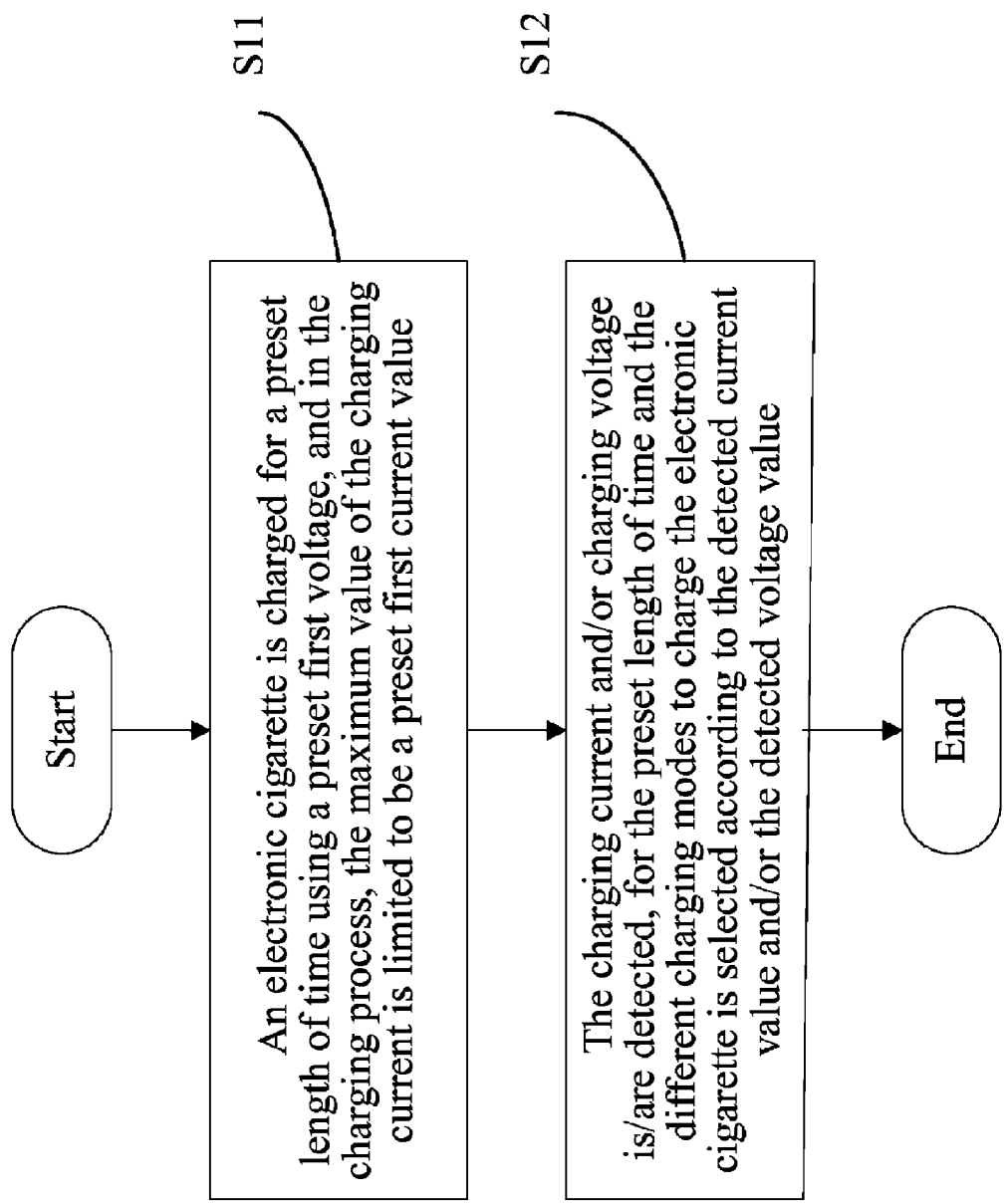
FIG. 5 is a flow chart of a charging method of electronic cigarettes of a first embodiment of the present invention.

FIG. 5 is a flow chart of the charging method of electronic cigarettes of a first embodiment of the present invention. In the charging method of electronic cigarettes according to the first embodiment of the present invention, the charging method of electronic cigarettes includes the following steps:

S11: an electronic cigarette is charged for a preset length of time using a preset first voltage, and in the charging process, the maximum value of the charging current is limited to be a preset first current value;

S12: during the charging process for the preset length of time, the actual charging current or actual charging voltage is detected, for the preset length of time and the different charging modes to charge the electronic cigarette is selected according to the actual charging current value and/or the actual charging voltage value.

Advantageously, the preset first voltage value in the step S11 is 5V, the preset length of time is 1 second, and the preset first current value is more than constant current value of the electronic cigarette charging.

In the charging method of electronic cigarettes according to the first embodiment of the present invention, by executing the steps S12, different charging modes to charge the electronic cigarette can be selected according to the actual charging current value or the actual charging voltage value.

Figure 6:
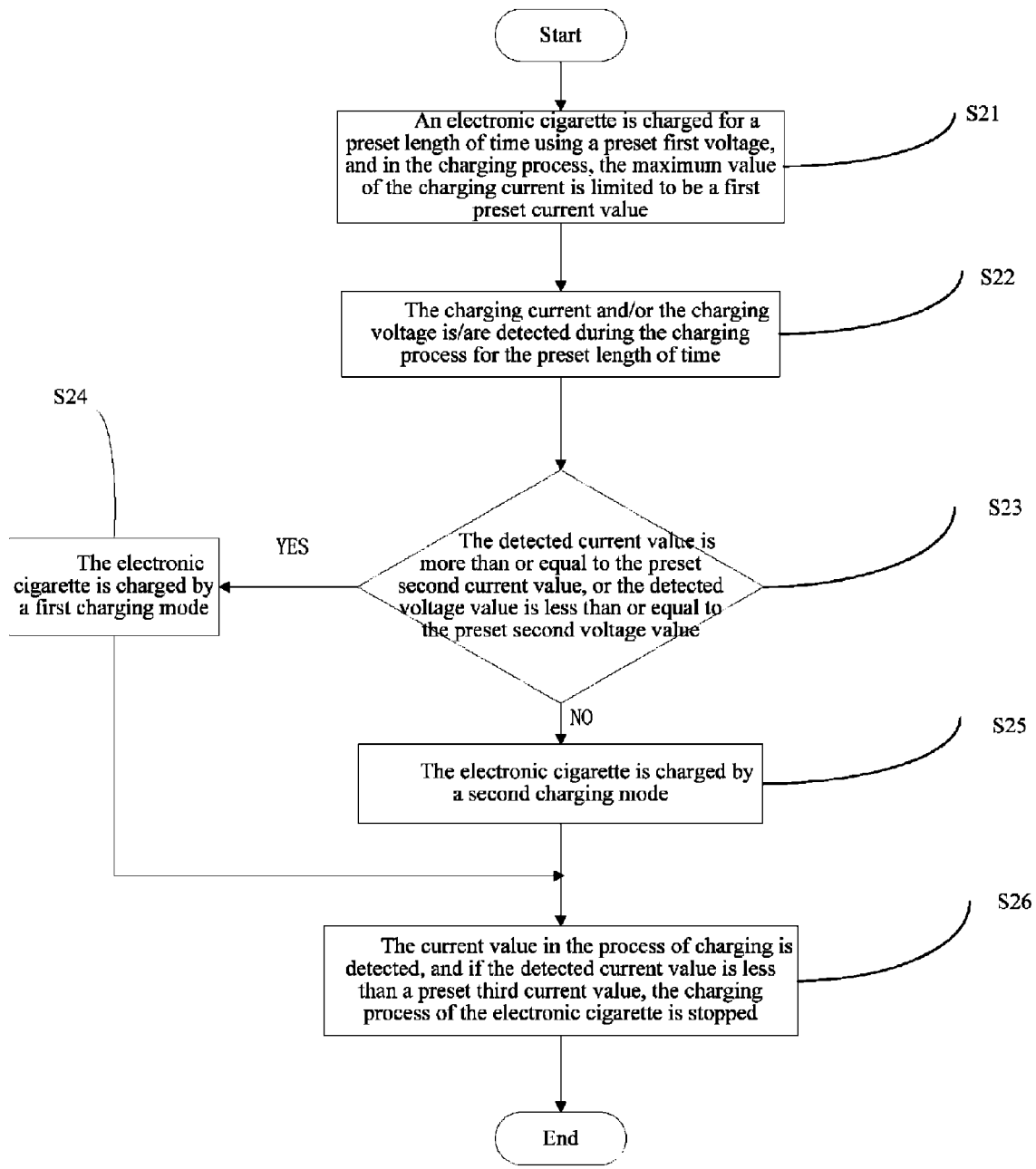
FIG. 6 is a flow chart of a charging method of electronic cigarettes of a second embodiment of the present invention.

FIG. 6 is a flow chart of a charging method of electronic cigarettes of a second embodiment of the present invention. In the charging method of electronic cigarettes according to the second embodiment of the present invention, the charging method of electronic cigarettes includes the following steps:

S21: an electronic cigarette is charged for a preset length of time using a preset first voltage, and in the charging process, the maximum value of the charging current is limited to be a first preset current value;

S22: the actual charging current or the actual charging voltage is/are detected during the charging process for the preset length of time;

S23: whether the actual charging current value is more than or equal to a preset second current value or not is determined, or whether the actual charging voltage value is less than or equal to a preset second voltage value or not is determined; if the actual charging current value is more than or equal to the preset second current value, or the actual charging voltage value is less than or equal to the preset second voltage value, step S24 is executed; if the actual charging current value is less than or equal to the preset second current value, or the actual charging voltage value is more than or equal to the preset second voltage value, step S25 is executed.

S24 the electronic cigarette is charged by a first charging mode, and step S26 is executed.

S25 the electronic cigarette is charged by a second charging mode, and step S26 is executed.

S26 the actual charging current value in the process of charging is detected, and if the actual charging current value is less than a preset third current value, the charging process of the electronic cigarette is stopped.

Advantageously, the first charging mode of step S24 is a charging mode using constant current and limiting the maximum of voltage to be 4.2V. The second charging mode of step S25 is a charging mode using a 5V charging voltage. The preset first voltage value in step S21 is 5V, the preset length of time is 1 second, and the preset first current value is more than constant current value of charging the electronic cigarette. The preset second current value of step S23 is more than the constant current value of charging the electronic cigarette. The preset third current value of step S26 can be 10 mA.

In the charging method of electronic cigarettes according to the second embodiment of the present invention, when charging the electronic cigarette by the first charging mode or by the second charging mode, the actual charging voltage and the actual charging current are detected. When the actual charging voltage and the actual charging current are more than preset threshold values, charging is stopped to protect the charging circuit.

In the charging method of electronic cigarettes according to the second embodiment of the present invention, the steps S21, S22 and S23 are firstly executed to determine whether the charging electronic cigarette includes a charging management circuit or not. Advantageously, the determining method is detailed as follows: using a 5V voltage and limiting the current to be A1 to charge the electronic cigarette 200 for is firstly (advantageously, A1 can be 1A, and A1 should be far more than the constant charging current A2 of a conventional electronic cigarette charging management circuit, particularly, A1≥2A2). Charging current A3 or a charging voltage U1 is detected. A3 is compared with A2 or U1 is compared with the preset second voltage value U2. If A3≥(1+50%) A2 or U1≤U2, it is illustrated that the electronic cigarette does not include a charging management circuit; and if A3<(1+50%) A2 or U1>U2, it is illustrated that the electronic cigarette includes a charging management circuit.

Particularly, if the electronic cigarette to be charged includes the charging management circuit, when the electronic cigarette is charged with the preset first voltage value, such as 5V, and the charging current is limited to be not more than the first current value, the actual charging current A3 will not change a lot (that is, the actual charging current value will be less than the preset second current value), while the actual charging voltage U1 will change (that is, the actual charging voltage will be more than the preset second voltage value).

Therefore, by executing the steps S21, S22 and S23, whether the charging electronic cigarette includes a charging management circuit or not can be determined.

If the electronic cigarette includes a charging management circuit, after the voltage of the rechargeable battery of the electronic cigarette box is boosted, the electronic cigarette is charged with a 5V voltage; and if the electronic cigarette does not include a charging management circuit, the electronic cigarette is charged by means of using constant current and limiting the maximum voltage to be 4.2V. In the process of charging, the actual charging current A3 is detected continuously, and when the actual charging current A3 is less than or equal to the preset third current value, such as 10 mA, the charging process of the electronic cigarette will be stopped.

In the embodiments of the electronic cigarette box and the charging method of electronic cigarettes of the present invention, by detecting whether the electronic cigarette to be charged comprising a charging management circuit or not, the different charging modes can be automatically selected according to the types of different electronic cigarettes, and the electronic cigarette box is enabled to be compatible with charging processes of different electronic cigarettes. It is easy to use for users, and the cost can be reduced. The users' experience can be improved, and the users' demands can be met better.

While the embodiments of the present invention are described with reference to the accompanying drawings above, the present invention is not limited to the above-mentioned specific implementations. In fact, the above-mentioned specific implementations are intended to be exemplary not to be limiting. In the inspiration of the present invention, those ordinary skills in the art can also make many modifications without breaking away from the subject of the present invention and the protection scope of the claims. All these modifications belong to the protection of the present invention.

What is claimed is:

1. A charging method of electronic cigarettes, comprising:
   S1、 presetting a first voltage, a first current, a length of time, a second current and a second voltage;
   S2、 charging an electronic cigarette with the first voltage as charging voltage and the first current as a maximum value of charging current for the length of time;
   S3、 detecting actual charging current or actual charging voltage to the electronic cigarette;
   S4、 comparing the actual charging current or the actual charging voltage with the second current or the second voltage separately;
   S5、 selecting one of charging modes to charge the electronic cigarette according to a comparing result.

2. The charging method according to claim 1, wherein the charging modes include a first charging mode and a second charging mode; and
   when the actual charging current is more than or equal to the second current, or the actual charging voltage is less than or equal to the second voltage, the first charging mode is selected to charge the electronic cigarette; and
   when the actual charging current is less than the second current or the actual charging voltage is more than the second voltage, the second charging mode is selected to charge the electronic cigarette.

3. The charging method according to claim 2, wherein the first charging mode is a charging mode of charging the electronic cigarette with a constant charging current and a charging voltage to be not more than 4.2V.

4. The charging method according to claim 2, wherein the second charging mode is a charging mode of charging the electronic cigarette with a 5V charging voltage.

5. The charging method according to claim 2, wherein the second current is more than a constant charging current of the electronic cigarette.

6. The charging method according to claim 2, wherein the method further includes: detecting the actual charging current in the first charging mode or the second charging mode, and stopping charging the electronic cigarette when the actual charging current is less than a preset third current.

7. The charging method according to claim 1, wherein the first voltage is 5V.

8. The charging method according to claim 1, wherein the length of time is 1 second.

9. The charging method according to claim 1, wherein the first current is more than a constant charging current of the electronic cigarette.

10. An electronic cigarette box configured for charging electronic cigarettes, wherein, the electronic cigarette box includes:
a microprocessor, a charging detection module respectively connected with the microprocessor and an electronic cigarette, and an electronic cigarette charging module respectively connected with the microprocessor and the electronic cigarette;
wherein the microprocessor is used for presetting with a first voltage, a first current, a length of time, a second current and a second voltage; and
the microprocessor is configured to control the electronic cigarette charging module to charge the electronic cigarette with the first voltage and the first current as a maximum value of charging current for the length of time; and
the charging detection module is configured to detect actual charging current or actual charging voltage; and
the microprocessor is further used for comparing the actual charging current or the actual charging voltage with the second current or the second voltage separately, and controlling the electronic cigarette charging module to select one of charging modes to charge the electronic cigarette according to a comparing result.

11. The electronic cigarette box according to claim 10, wherein the charging modes include a first charging mode and a second charging mode, and when the actual charging current detected by the charging detection module is more than or equal to the second current or the actual charging voltage detected by the charging detection module is less than or equal to the second voltage, the microprocessor is further configured to control the electronic cigarette charging module to select the first charging mode to charge the electronic cigarette; and
when the actual charging current detected by the charging detection module is less than the second current or the actual charging voltage detected by the charging detection module is more than the second voltage the microprocessor is further configured to control the electronic cigarette charging module to select the second charging mode to charge the electronic cigarette.

12. The electronic cigarette box according to claim 11, wherein the first charging mode is a charging mode of charging the electronic cigarette with a constant charging current and limits a charging voltage to be not more than 4.2V.

13. The electronic cigarette box according to claim 11, wherein the second charging mode is a charging mode of charging the electronic cigarette with a 5V charging voltage.

14. The electronic cigarette box according to claim 11, wherein in the first charging mode or the second charging mode, the charging detection module is further configured to detect the actual charging current;
wherein the microprocessor is also used to compare the actual charging current with a preset third current value, and if the actual charging current is less than the preset third current, then the electronic cigarette charging module is controlled to stop charging the electronic cigarette.

15. The electronic cigarette box according to claim 10, wherein the electronic cigarette box also includes a booster module and a rechargeable battery, the booster module is used to boost voltage of the rechargeable battery to charge the electronic cigarette.

16. The electronic cigarette box according to claim 15, wherein the electronic cigarette box further includes a low voltage detection module, an overcurrent detection module, an overvoltage detection module, a charging module, and a charging management module;
the low voltage detection module is configured to detect the voltage of the rechargeable battery in the electronic cigarette box and a voltage detection results are transmitted to the microprocessor, when the voltage detection result is less than a preset low voltage, the microprocessor will control the electronic cigarette charging module to stop charging the electronic cigarette;
the overcurrent detection module is configured to detect current of charging circuit in the electronic cigarette box and a current detection result is transmitted to the microprocessor, when the current detection result is more than a preset over current, the microprocessor will control the electronic cigarette charging module to stop charging the electronic cigarette;
the overvoltage detection module is configured to detect voltage of the charging circuit in the electronic cigarette box and a voltage detection results is transmitted to the microprocessor, when the voltage detection result is more than a preset high voltage, the microprocessor will control the electronic cigarette charging module to stop charging the electronic cigarette;
the charging module is configured to connect with an external power source, and to charge the rechargeable battery in the electronic cigarette box;
the charging management module is configured to manage the external charging power supply in charging process of the rechargeable battery of the electronic cigarette box, make the charging mode of the rechargeable battery to be constant current or constant voltage mode.

17. The electronic cigarette box according to claim 10, wherein the first current is more than a constant current.

18. The electronic cigarette box according to claim 10, wherein the second current is more than a constant current.

* * * * *